S. R. WILMOT.
Case for Clock-Work Motor.

No. 223,425. Patented Jan. 6, 1880.

Witnesses
John Becker
Fred Wagner

Inventor
S. R. Wilmot
by his Attorneys
Brown & Allen

UNITED STATES PATENT OFFICE.

SAMUEL R. WILMOT, OF BRIDGEPORT, CONNECTICUT, ASSIGNOR TO BRIDGEPORT BRASS COMPANY, OF SAME PLACE.

CASE FOR CLOCK-WORK MOTORS.

SPECIFICATION forming part of Letters Patent No. 223,425, dated January 6, 1880.

Application filed July 10, 1877.

*To all whom it may concern:*

Be it known that I, SAMUEL R. WILMOT, of Bridgeport, in the county of Fairfield and State of Connecticut, have invented an Improvement in Cases and Frames for Clock-Work Motors; and I do hereby declare that the following is a full, clear, and exact description of the same, reference being had to the accompanying drawings, forming part of this specification.

My invention relates more particularly to cases and frames for clock-work motors applied to driving fans for ventilation or to keep flies from articles placed on tables, show-counters, &c.; but it may be applied to clock-work motors for other purposes.

The invention has for its object to make a clock-work-motor case also serve the purpose of a frame for supporting the bearings of the clock-work motor; to facilitate the manufacture of such cases and frames; to secure exactitude in the positions of the bearings of wheels and pinions, and to prevent access of dust or dirt to the clock-work.

The invention consists in the novel construction of the case, by which it is made to act as a frame, and which secures the aforementioned objects.

Figure 1:
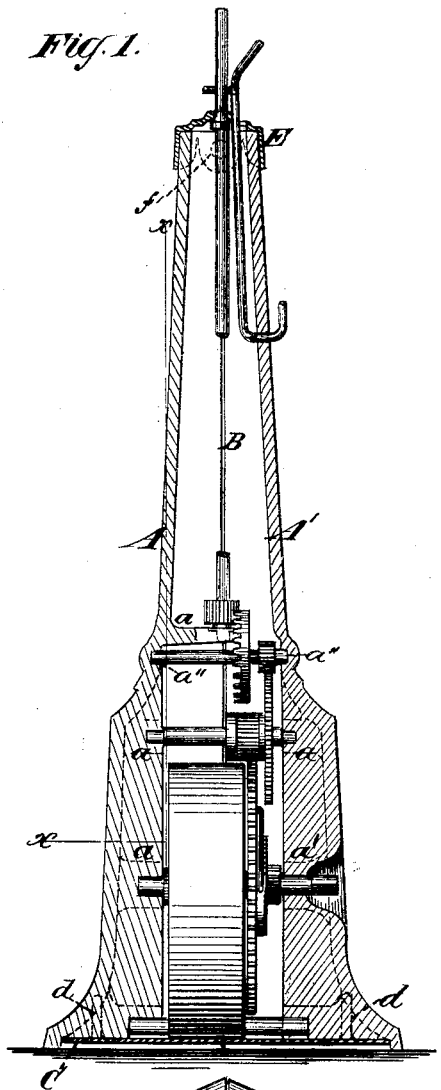
Figure 2:
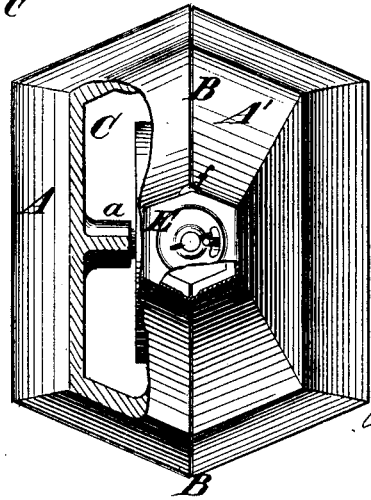

Figure 1 in the drawings is a longitudinal vertical section of a case and frame for clock-work motors constructed according to my invention. Fig. 2 is a top view of the same with a portion of the case broken away to partially display the inclosed clock-work.

In clock-work motors of this kind, as usually constructed, there is a separate frame for the clock-work. In my invention I make the case in such manner that the separate frame is not needed, thus cheapening the manufacture of the article.

To facilitate the manufacture of the case, to avoid inaccuracies in the positions of the bearings, and to exclude dust, I construct the upright portion of the case in two parts, A and A', which meet and are fitted to each other in or at a vertical seam or joint, B. On the interior surfaces of the parts A A' are formed projections $a$ and $a'$, in which are drilled bearings for the shafts of the clock-work gearing; but these projections may, for some of the bearings, be omitted, the bearings being drilled in the walls of the case, as shown at $a''$.

The arrangement of the bearings, of course, differs according to the construction of the clock-work train; but in any case the opposite bearings in the parts A A' of the case are drilled by the use of a drilling-jig, and in this way great exactitude in the positions of the bearings is secured, the holes for the bearings being drilled exactly alike in each of said parts of said case. The parts A A' of the case being thus prepared, are put together in such manner as to support the clock-work train and receive the ends of the shafts in the drilled bearings. A tightly-fitting bottom plate is attached to the bottom C of said united parts by screws $d$, said plate and screws holding the said parts permanently and firmly united at the bottom. The top of the united parts A A' have formed on opposite sides exterior projections, $f$. A cap, E, of any soft tough metal, preferably brass, is fitted and placed to cover and inclose the upper extremity of the said united parts A A', and closed down over the projections $f$, which holds said cap firmly attached to said united parts. Said cap holds the said parts A A' firmly united at the top.

In this way the case is cheaply, quickly, and accurately constructed, dust and dirt are excluded from the clock-work, and the case acts as a frame for the clock-work.

I claim—

The combination of the sections A A', for inclosing a clock-work motor, with the top cap, E, and bottom plate, C, the inside surfaces of said sections being provided with projections for the shafts of the clock-work gearing, all substantially as herein set forth.

In testimony whereof I hereunto set my hand in the presence of two subscribing witnesses.

S. R. WILMOT.

Witnesses:
 FRED. HAYNES,
 EDWARD B. SPERRY.